Jan. 23, 1945.  K. E. A. GÖTHBERG ET AL  2,367,721
PNEUMATIC LUBRICATING DEVICE
Filed April 9, 1941  2 Sheets-Sheet 1

Inventors:
Karl Evald Andreas Göthberg
John Ture Ruist
Josef Henrik Emanuel Thorén Jan. 23, 1945. K. E. A. GÖTHBERG ET AL 2,367,721
PNEUMATIC LUBRICATING DEVICE
Filed April 9, 1941 2 Sheets-Sheet 2

Inventors:
Karl Evald Andreas Göthberg
John Ture Ruist
Josef Henrik Emanuel Thorén
By: Thouron & Thouron Attys Patented Jan. 23, 1945

2,367,721

UNITED STATES PATENT OFFICE 2,367,721

PNEUMATIC LUBRICATING DEVICE

Karl Evald Andreas Göthberg, John Ture Ruist, and Josef Henrik Emanuel Thorén, Goteborg, Sweden, assignors, by mesne assignments, to SKF Industries, Inc., Philadelphia, Pa., a corporation of Delaware Application April 9, 1941, Serial No. 387,744
In Sweden June 26, 1940

2 Claims. (Cl. 184—55)

The present invention relates to a pneumatic lubricating device in which a lubricant container is connected to an air line for supplying lubricant to the air flow. The invention has for its purpose to separate superfluous lubricant from the air in a simple manner, so that the concentration of the lubricant in the escaping air lubricant mixture is maintained uniform and the consumption of lubricant low.

With regard to this purpose the lubricating device according to the invention is characterized thereby, that the upper part of the lubricant container forms part of the air line after the point at which lubricant is supplied to the air in the direction of the flow. When the air containing the lubricant enters the upper part of the container above the lubricant level, its velocity is reduced, whereby a deposition of the larger drops of lubricant from the air takes place.

The invention is further explained with reference to the accompanying drawings, which show two different embodiments by way of example.

Figure 1:
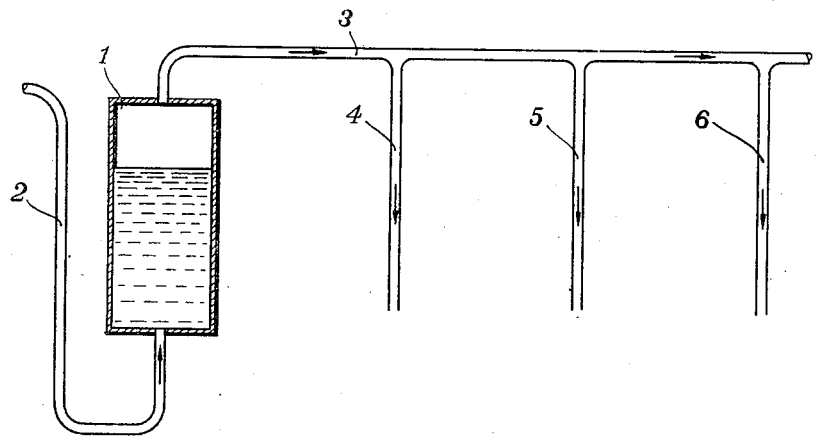
Fig. 1 shows diagrammatically the lubricating device and the air lines and lubricant lines.

In Fig. 1 the lubricating apparatus proper is designated by 1, to which a pressure air line 2 is connected. From the lubricating apparatus a conduit 3 extends and is connected through branch conduits 4, 5, and 6 to a number of different lubricant places, for instance ball bearings in machine tools.

Figure 2:
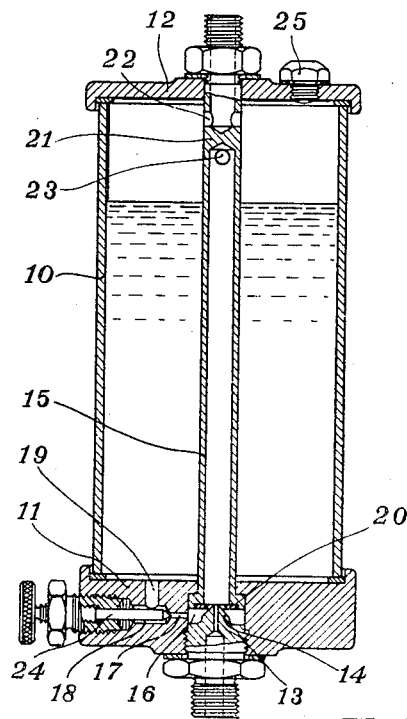
Fig. 2 is a vertical section through the lubricating apparatus.

The lubricating apparatus, designated in Fig. 1 by the numeral 1, consists, as shown in Fig. 2, of a glass cylinder 10 with bottom 11 and lid 12, said cylinder serving as an oil container. In the lid a filling opening having a screw plug 25 or other closing arrangement is provided. The bottom 11 is bored through and provided with a central connection 13 for the pressure air. The said connection has at the upper end a part 14 of reduced diameter and a narrow outlet channel opening into a vertical tube 15 provided centrally in the oil container. The narrower portion 14 of the connection is encircled by an annular chamber 16, which through conduits 17, 18, and 19 is connected to the oil container. At the lower end of the tube 15 a washer 20 is provided which, with some interspace surrounds the portion 14. The parts 13, 20 form together an injector. The tube 15 is at the upper end provided with a partition 21, there being holes 22 and 23 at both sides of the said partition.

When the pressure air is introduced through the connection 13, lubricant is drawn into the air flow outside the outlet opening of the portion 14 owing to reduction of pressure obtaining there. Hereby a fog-like mixture of oil and air is created, which moves upwards through the tube 15. Through the hole 23 the oil vapour flows out into the chamber above the oil level in the container, whence it flows through the hole 22 further upwards through the tube 15 out of the lubricator proper.

In the upper position of the container the speed of flow of oil vapour is considerably reduced owing to the great area of passage, whereby a separation of too large drops from the vapour takes place. The chamber above the oil level also functions as a storage for the oil vapour, so that the oil vapour leaving the lubricator has a relatively uniform concentration, independent of any occasional interruptions of the supply of oil to the air at the bottom of the container. The lubricant container thus serves a three-fold purpose, namely as a lubricant container, lubricant separator and storage for the oil vapour.

A further advantage of the lubricating device is that the oil container will only be exposed to the reduced pressure obtaining after passing the reducing valve, whereby the sealing of the oil container does not cause any great difficulties.

The consumption of oil can be regulated by means of a needle valve 24 provided in the connection between the container and the reducing valve of the pressure air line. When changing from one kind of oil to another the washer 20 can be exchanged.

Figure 3:
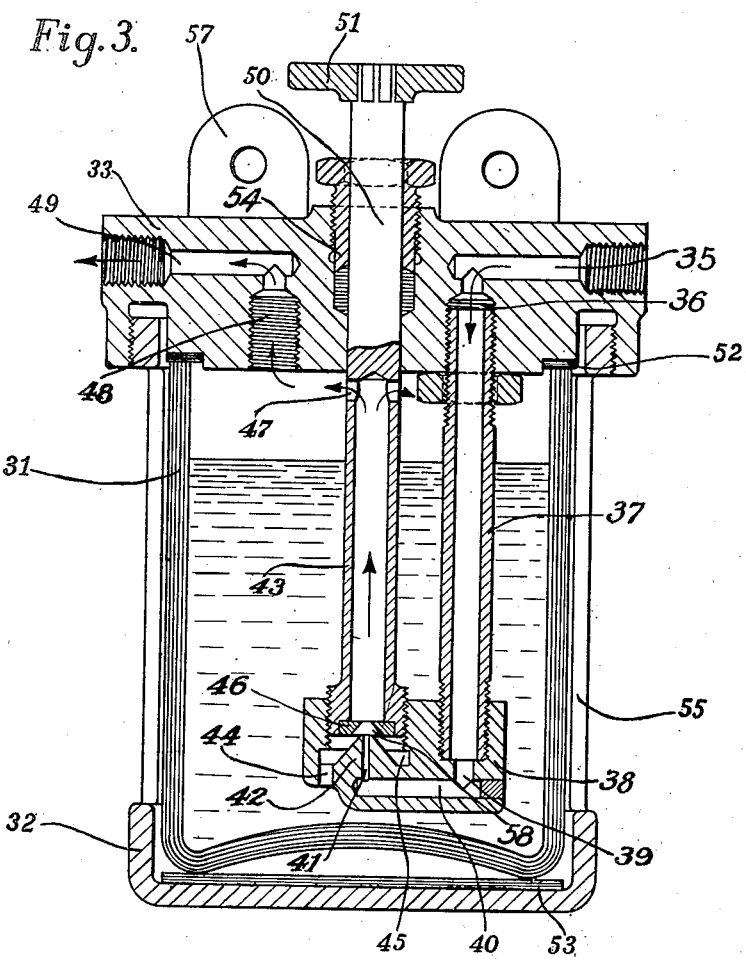
Fig. 3 is a vertical section through a modified embodiment of the lubricating apparatus.
Figure 4:
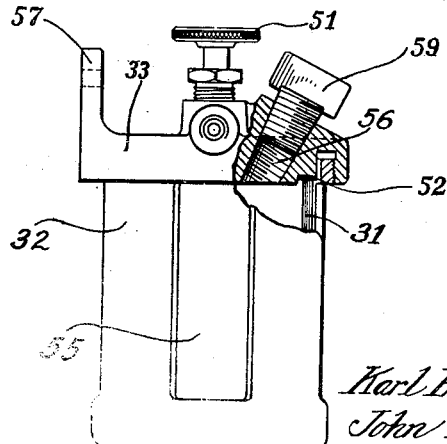
Fig. 4 shows on a reduced scale and partly in section a vertical projection of the lubricating apparatus.

Figs. 3–4 show a second embodiment, which is particularly leak-proof and protected from blows.

In this embodiment of the invention the lubricant container consists of a glass container 31, provided in a cage 32 preferably of cast iron to protect the glass container from blows. A lid or cover 33 is screwed on to the cage 32. The lower part of the container 31 is in one whole piece, and there is no possibility of leakage at this point.

The pressure air is introduced from above through channels 35, 36 in the lid 33 and through a tube 37 screwed to the underside of the lid. The lower end of the tube 37 is screwed to a valve housing 38. In the valve housing the air is led through channels 39, 40 and a narrowed outlet channel, arranged in a conical portion 42 of the valve housing. A tube 43 is screwed from above into the valve housing and forms an upwardly directed continuation of the channel 41. In the housing 38 there are one or more channels 44 which connect the bottom part of the lubricant container with an annular chamber 45 in the valve housing surrounding the portion 42. At the lower end of the tube 43 a washer 46 is provided which together with the part 42 forms an interspace 58 through which the chamber 45 is connected to the tube 43. The parts 42, 46 form together an injector. Owing to the suction occurring as a result of the discharge from the channel 41, lubricant is drawn through the channel 44, the chamber 45 and the interspace 58 between the part 42 and the washer 46 in the pressure air line, so that an oil fog vapour is created streaming upwards through the tube 43. The oil vapour escapes through holes 47 in the tube 43 into the upper part of the container, which according to the invention serves as an oil separator. Too large drops are thus deposited here, and the remainder of the oil vapour escapes from the device through channels 48, 49 in the lid 33, as shown by the arrows.

The tube 43 has an upper prolongation 50 extending upwards through the lid 33 and provided with a handwheel 51. By means of the handwheel 51 the tube 43 can be screwed upwards or downwards in the housing 38, whereby the interspace 58 between the part 42 and the washer 46 can be made greater or smaller. By turning the handwheel 51 it is thus possible to regulate the supply of lubricant to the pressure air flow, so that the desired concentration of oil vapour escaping from the lubricant device is obtained. By screwing down the tube 43, so that the washer 46 engages the part 42, the supply of lubricant to the pressure air line can be cut off.

In order to prevent the oil vapour above the level of the lubricant from leaking out between the upper edge of the glass container 31 and the lid 33, a packing 52 of leather, cork or other suitable material is provided between them, and the container rests on a plate 53 of fibre or other similar elastic material. A packing box 54 provided between the prolongation 50 of the tube 43 and the lid further prevents leakage.

The walls of the cage 32 are provided with windows 55 (Fig. 4) through which the oil level in the container can be observed, and in the lid 33 there is an opening 56 provided with an oil plug 59, through which the lubricant supply can be replenished when necessary. The lubricant level should of course always be lower than the holes 47, so that the upper part of the container can function as lubricant separator. The level should also always be higher than the outer mouth of the channel 44, so that oil can be drawn into the pressure air line. The mouth of the channel 44 being disposed at a certain height above the bottom of the container, any bottom residue of impurities which would cause an obstruction in the channel 44 or in other channels of the lubricator is prevented from entering the chamber 44.

The lid 33 is provided with two ears 57 for the mounting of the device on a wall or the like. The channels 35, 36 of the lid 33 for pressure air and its channels 48, 49 for the oil vapour are identically the same. By this means it is possible to connect the pressure air line and the line for oil vapour to those sides of the arrangement which are most suitable with regard to the local circumstances.

The invention is not limited to the embodiment shown on the drawings but can be modified in different ways. The lubricating device can thus for instance be made without injector arrangement, whereby the lubricant is introduced into the pressure air flow only by the aid of hydraulic pressure.

Having thus described our invention, we claim and desire to secure by Letters Patent:

1. In a pneumatic lubricating device, the combination of a lubricant container, and an air line extending into the upper part of the container and therefrom within the container to the lower part thereof, means located in the lower part of the container for the introduction of lubricant to the air, a lubricant conduit extending from said means up through and out of the container, the lower end of the lubricant conduit from said means to the upper part of the container constituting a regulating member for the regulation of the introduction of lubricant to the air stream, and said lubricant conduit being provided with a closed extension extending through the cover and above the said cover being provided with an operating member, such as a handwheel, for the regulation of the introduction of lubricant to the air stream.

2. In a pneumatic lubricating device, the combination of a lubricant container, and an air line extending into the upper part of the container and therefrom within the container to the lower part thereof, means located in the lower part of the container for the introduction of lubricant to the air, and a lubricant conduit extending from said means up through and out of the container, the said means for the introduction of lubricant to the air line comprising a housing, and the lower end of the lubricant conduit from said means to the upper part of the container being threaded into the housing and being made as a regulating member for the regulation of the introduction of lubricant to the air stream, said lubricant conduit being provided with a closed extension extending through the cover, and above said cover being provided with a handwheel by means of which said conduit can be screwed up or down in the housing for the regulation of the introduction of lubricant to the air.

KARL EVALD ANDREAS GÖTHBERG.
JOHN TURE RUIST.
JOSEF HENRIK EMANUEL THORÉN.